(12) United States Patent
Morreale et al.

(10) Patent No.: US 9,551,233 B2
(45) Date of Patent: Jan. 24, 2017

(54) LABYRINTH SEAL AND ROTATING MACHINE COMPRISING SUCH A SEAL

(71) Applicant: SNECMA, Paris (FR)

(72) Inventors: Serge Rene Morreale, Guignes (FR); Arnaud Jean-Marie Pierrot, Le Mee sur Seine (FR)

(73) Assignee: SNECMA, Paris (FR)

( * ) Notice: Subject to any disclaimer, the term of this patent is extended or adjusted under 35 U.S.C. 154(b) by 121 days.

(21) Appl. No.: 14/509,276

(22) Filed: Oct. 8, 2014

(65) Prior Publication Data

US 2015/0097342 A1    Apr. 9, 2015

(30) Foreign Application Priority Data

Oct. 9, 2013 (FR) ...................................... 13 59818

(51) Int. Cl.

| | |
|---|---|
| *F16J 15/44* | (2006.01) |
| *F16J 15/40* | (2006.01) |
| *F01D 11/02* | (2006.01) |
| *F01D 11/04* | (2006.01) |
| *F16J 15/447* | (2006.01) |
| *F16J 15/453* | (2006.01) |
| *F16J 15/16* | (2006.01) |

(52) U.S. Cl.

CPC ............... *F01D 11/04* (2013.01); *F01D 11/02* (2013.01); *F01D 11/025* (2013.01); *F16J 15/164* (2013.01); *F16J 15/447* (2013.01); *F16J 15/4472* (2013.01); *F16J 15/453* (2013.01); *F16J 15/40* (2013.01)

(58) Field of Classification Search

CPC ....... F01D 11/001; F01D 11/02; F01D 11/025; F01D 11/18

See application file for complete search history.

(56) References Cited

U.S. PATENT DOCUMENTS

| | | | | |
|---|---|---|---|---|
| 1,528,895 | A | * | 3/1925 | Schmidt .................. F01D 11/02 277/413 |
| 2,587,326 | A | | 2/1952 | Islip et al. |
| 2,893,357 | A | | 7/1959 | Clarke |
| 3,854,843 | A | * | 12/1974 | Penny ..................... F01D 11/18 415/197 |

(Continued)

FOREIGN PATENT DOCUMENTS

| | | |
|---|---|---|
| EP | 0 132 182 A1 | 1/1985 |
| FR | 983292 | 6/1951 |

(Continued)

OTHER PUBLICATIONS

U.S. Appl. No. 14/646,872, filed May 22, 2015, Morreale, et al.

(Continued)

*Primary Examiner* — Kristina Fulton
*Assistant Examiner* — Nicholas L Foster
(74) *Attorney, Agent, or Firm* — Oblon, McClelland, Maier & Neustadt, L.L.P.

(57) ABSTRACT

One of the components (15), opposite a labyrinth seal (12), is arranged sliding on a conical interface (18) of its support (7, 19) and constructed from a material with different thermal expansions, so as to reduce the clearance with the component face to face (13, 14), at steady state, at high temperature. The sealing surface (25) may be assured by a circulation of oil.

12 Claims, 3 Drawing Sheets

(56) References Cited

U.S. PATENT DOCUMENTS

| | | | |
|---|---|---|---|
| 4,373,858 A | 2/1983 | Eastman | |
| 4,565,492 A | 1/1986 | Bart et al. | |
| 6,250,641 B1* | 6/2001 | Dinc | F16J 15/3288 |
| | | | 277/355 |
| 6,382,905 B1* | 5/2002 | Czachor | F01D 11/122 |
| | | | 415/128 |
| 6,435,514 B1* | 8/2002 | Aksit | F16J 15/445 |
| | | | 277/355 |
| 7,967,297 B2* | 6/2011 | Zheng | F16J 15/164 |
| | | | 277/355 |
| 2006/0013681 A1* | 1/2006 | Cardarella, Jr. | F01D 11/02 |
| | | | 415/1 |
| 2007/0253810 A1 | 11/2007 | Mons et al. | |
| 2008/0008579 A1* | 1/2008 | Mikulec | F16J 15/164 |
| | | | 415/170.1 |
| 2010/0148449 A1 | 6/2010 | Gaebler | |
| 2015/0044018 A1* | 2/2015 | Dierksmeier | F01D 11/001 |
| | | | 415/1 |

FOREIGN PATENT DOCUMENTS

| | | |
|---|---|---|
| FR | 2 560 293 A1 | 8/1985 |
| FR | 2 560 293 A1 | 8/1985 |
| FR | 2 893 360 A1 | 5/2007 |
| FR | 2 961 283 A1 | 12/2011 |
| FR | 2 961 283 A1 | 12/2011 |
| FR | 2 983 909 A1 | 6/2013 |
| FR | 2 983 909 A1 | 6/2013 |
| JP | 59-3122 | 1/1984 |
| JP | 59-3122 A | 1/1984 |

OTHER PUBLICATIONS

French Preliminary Search Report issued Jun. 5, 2014, in French Application No. 13 59818 filed Oct. 9, 2013 (with English Translation of Categories of Cited Documents).

* cited by examiner

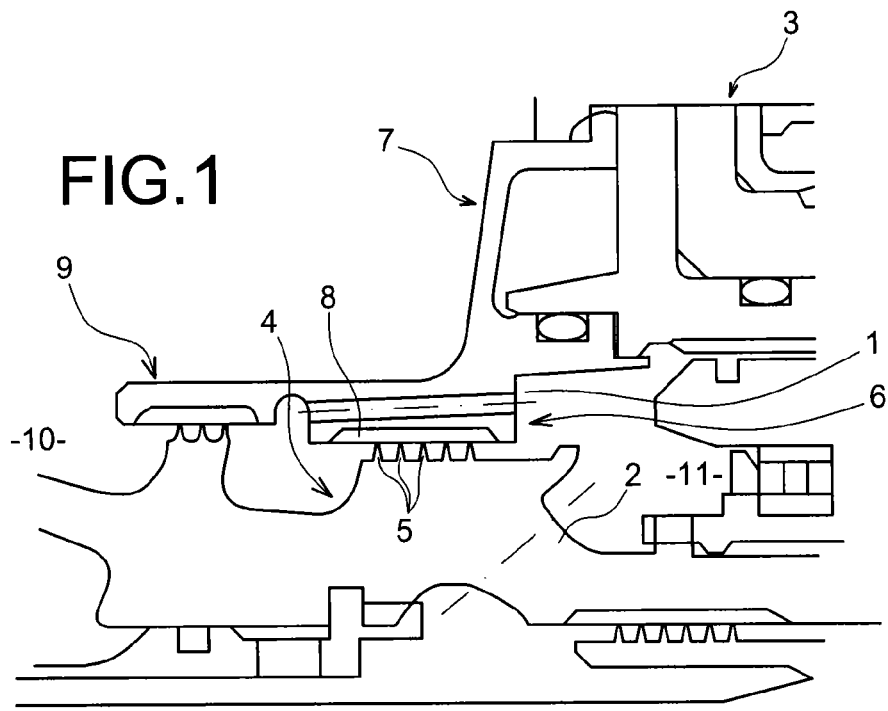
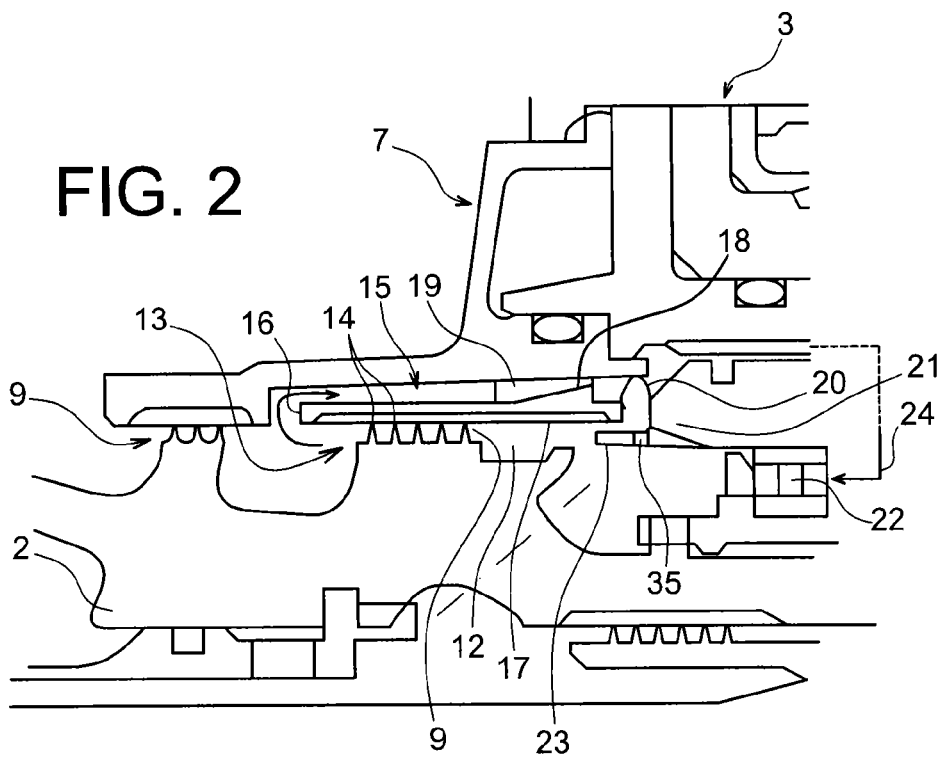

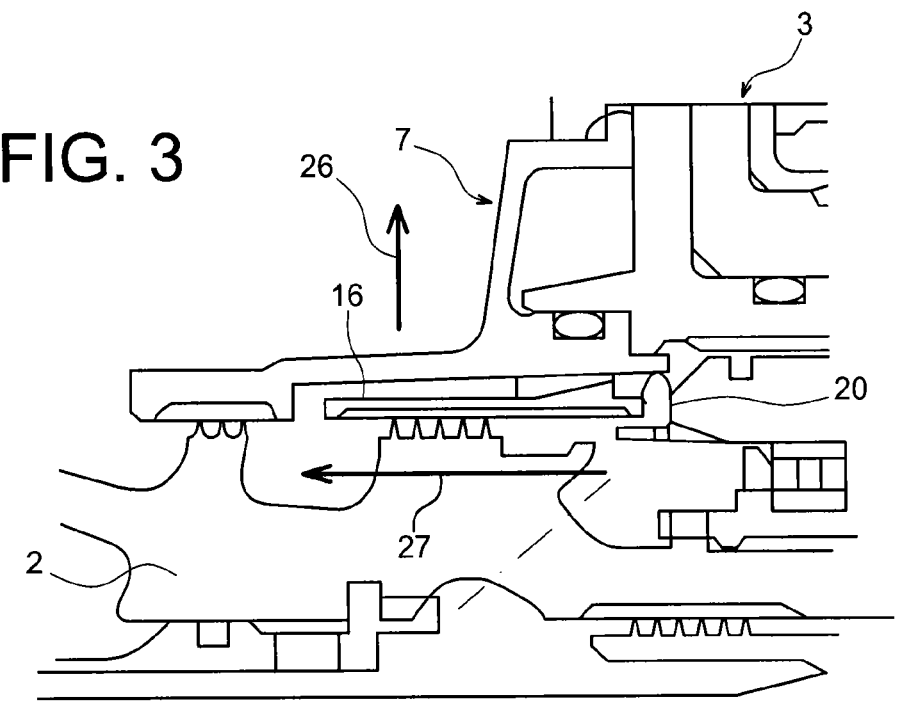
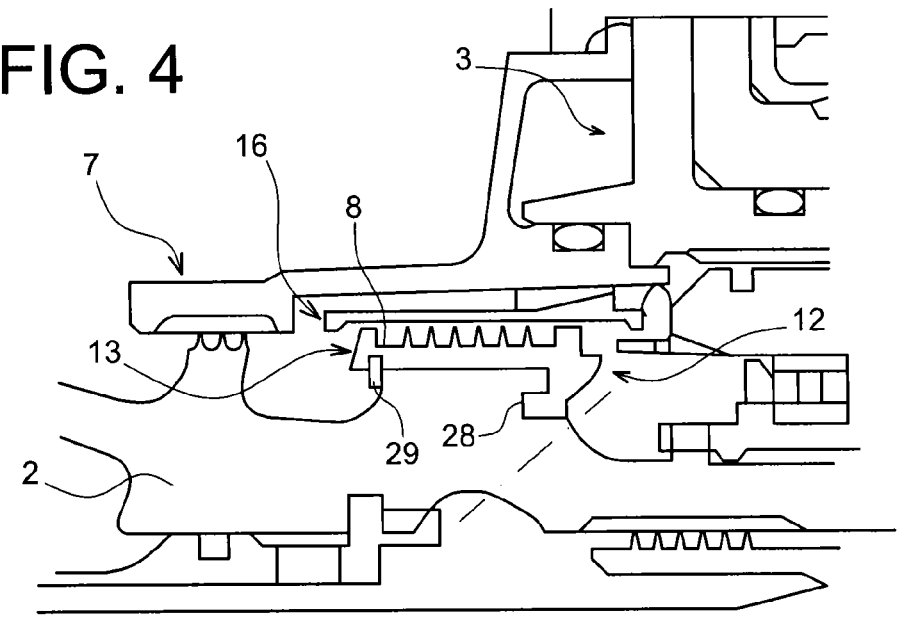

LABYRINTH SEAL AND ROTATING MACHINE COMPRISING SUCH A SEAL

The present invention relates to a labyrinth seal and a rotating machine incorporating such a seal and, for example but without excluding other applications, a turbomachine comprising two coaxial and concentric drive shafts, driven at different rotational speeds and which can be counter-rotating.

Labyrinth seals comprise two components facing each other without contact, which a small clearance separates. They separate the surrounding volume into two enclosures being able to be subjected to different pressures. A reduced flow gas leak is tolerated through the clearance. A conventional type of labyrinth seal comprises sealing lips, in other words protruding crests, on a first of the components, and an abradable layer, which can be eroded by the friction of the sealing lips if the clearance disappears, on the second of the components. The components of the labyrinth seal may be flat, separated by an axial clearance, or concentric, separated by a radial clearance; it is rather these latter seals that will be considered here.

It is desirable to reduce the clearance to perfect the sealing between the enclosures and to avoid losses of pressure, lubricant and undesirable heating, in applications where the gas present in the enclosure under positive pressure is subjected to a high temperature. The parts present in the enclosure at lower pressure then undergo a temperature rise which could reduce their lifetime, and the oil, having leaked from the enclosure under positive pressure, apart from the fact that it has to be renewed, is deposited in the enclosure at lower pressure, soils it and may even coke it.

Yet, the reduction of the clearance comes up against certain constraints. Rotating machines are subjected to transient and steady states, very different between cold start-ups and various cruising rates, during which differential thermal expansions may arise between the parts bearing the two components constituting the seal, which implies considerable variations in the clearance, which can even become negative.

This state, corresponding to a tightening between the components of the seal turning at very different speeds, could lead to the destruction of the seal or even of the whole machine. That is why it is common, to obviate this situation, to manufacture the sealing surface facing the sealing lips out of abradable material, which the sealing lips score as soon as this negative clearance arises. This wear of the abradable material nevertheless has the drawback of enabling increased leaks when the clearance has returned to a normal value. One is therefore dissuaded from limiting the clearance as a function of the value that it would take at steady state cruising rate, due to these transitory states. A minimum clearance must also be accepted to allow the mounting of the seal, and this clearance determines that which is then reached at cruising rates (steady state) of the machine.

Another type of seal for such rotating machines has also been proposed: they comprise wearing parts made of carbon fixed to one of the rotating assemblies and in rubbing contact against each other. Leaks between the enclosures are then almost zero, but these seals are fragile, expensive, have rapid wear, and their use becomes impossible when the difference between the rotational speeds of the two rotating assemblies is excessive or when turnings (axial movements between the rotating assemblies, due to the differential thermal expansions) are significant.

Documents U.S. Pat. No. 4,373,858-A and FR-983 292 A also disclose other designs of seals, one of the components of the seal is mounted mobile on the part to which it is secured, so as to compensate either a differential axial expansion of the rotor (the seal being composed of two flat components separated by an axial clearance), or a variation in the leakage flow rate through the seal. Springs are employed with such devices and serve to maintain a position of stop in the first document, and to contribute to a balance of forces in the second document.

The present invention relates to a labyrinth seal of the type described above, but able to have reduced clearances, at least at stable cruising rate, in hot operation, of the machine to which they belong.

In a general form, this seal comprises a first component and a second component facing the first component, the components being concentric, separated by a clearance and each secured to a respective part; it is characterised in that one of its components is mobile, secured to the part that bears it by a conical interface having a conicity directed along the axis of rotation, formed of a conical face of a collar of said part and of a conical face, opposite the clearance, of the mobile component, the conical faces being in sliding contact on each other and having a same conicity, and by a spring maintaining said mobile component against the conical face of the collar by a thrust along the axis of rotation, and in that the mobile component and the collar have different thermal expansion coefficients.

The mobile component is thus a free ring, the thermal expansion of which is independent from that of the collar to which it is secured, but which is maintained in place against it by the spring. The material of the free ring may then be chosen so that its clearance with the other component of the seal is reduced in so far as the temperature of the machine increases, from a determined value of the clearance when cold, which is necessary to mount the seal, down to a very low value at the operating temperature. The sliding on the collar makes it possible to maintain contact with the collar and thus prevents the disjunction of the free ring, even if the collar is also constructed from a material having a greater thermal expansion than the free ring. A normal construction for this invention will thus comprise a free ring made of a first material, and the surrounding static structural parts made of a second material, normally metal.

The mobile component may surround the other component, and it is then advantageously constructed from a material of which the expansion coefficient is less than that of the other component, and than that of the two parts in relative rotation.

The other sealing component may be a fixed component, secured to the respective part by a rigid assembly, or form one part therewith.

In a particular embodiment, the sealing surface is formed by a liquid, and the mobile component, which surrounds the other component, is concave and forms a bath facing the other component and receiving the liquid. This liquid then replaces the conventional abradable material; its advantage is not to be subjected to wear when the sealing lips are caused to penetrate therein in negative clearance conditions. A smooth and regular sealing surface reforms as soon as the sealing lips come back out of the liquid, at an invariable position, providing the liquid is renewed.

The invention also relates to a rotating machine comprising parts in relative rotation and the aforementioned seal. In numerous cases, the two parts have two rotors belonging to drive shafts driven at different rotational speeds, and the seal establishes a sealing between two drive shafts. This machine may be provided, in the preceding case where the sealing surface is composed of a liquid, with a circuit for supplying this liquid in order to renew it; it may be an autonomous circuit or, perhaps in a better manner, an oil circuit for lubricating a bearing adjacent to the seal and which is subjected to a continuous lubrication, said circuit being laid out for the requirements of the invention.

In certain embodiments, the flow of liquid may be exploited to keep the second component at a determined temperature, the liquid then also having a heat extraction role. Maintaining the temperature of the second component at a different value may then contribute to the reduction of the clearances while reinforcing the effect of the differential thermal expansion of the material of the second component.

According to certain optional, but advantageous, characteristics:
- the device supplying the liquid comprises a distributor situated in front of the bath, and said distributor is advantageously a free end;
- the oil circuit comprises a partial diversion of the oil which bypasses the free end and the bowl and leads directly to the recovery surface;
- the mobile component is constructed from a material of which the thermal expansion coefficient is less than $8 \cdot 10^{-6}$/K, preferentially less than $5 \cdot 10^{-6}$/K in the temperature range from 0° C. to 400° C., whereas other parts of the seal, and in the first place that to which the mobile component is secured, have a coefficient close to $14 \cdot 10^{-6}$/K in this temperature range; they may be made of steel, aluminium and titanium, whereas the mobile component may be made of ceramic;
- the spring may consist of a conical washer or of a stack of conical washers;
- or the conicity may have a cone half-angle of at least 3°, and this half-angle may be greater than 10°, or even 15°; this half-angle will be as big as possible;
- the rotating machine comprises a second labyrinth seal comprising a first component provided with other protruding circular sealing lips and a second component provided with another sealing surface facing said other sealing lips, and the components of the second seal are secured fixedly to the parts in relative rotation.

Other characteristics, advantages and aspects of the invention will become clear from the detailed description of the invention, which will now be made from a certain number of particular embodiments, not exclusive to others, using the following figures:

FIG. 1 illustrates a traditional design of labyrinth seal;

FIG. 2 illustrates a first embodiment of the invention after mounting;

Figure 5:
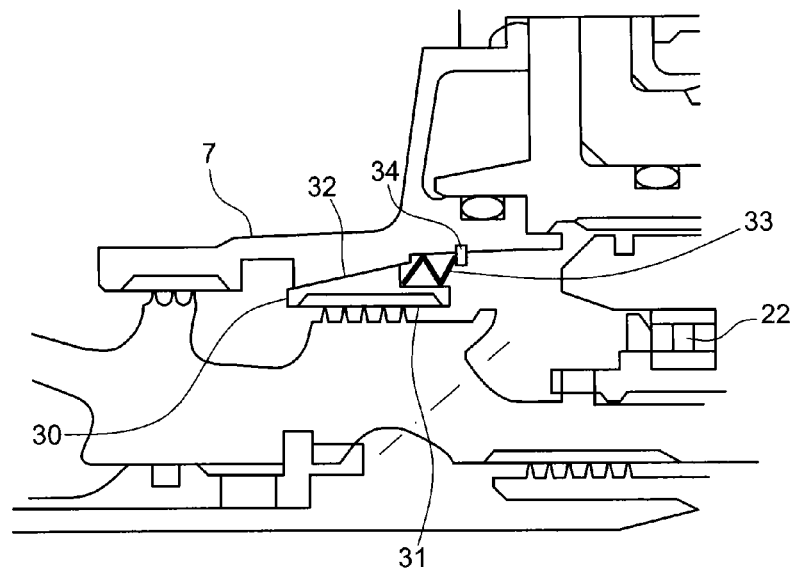
Figure 6:
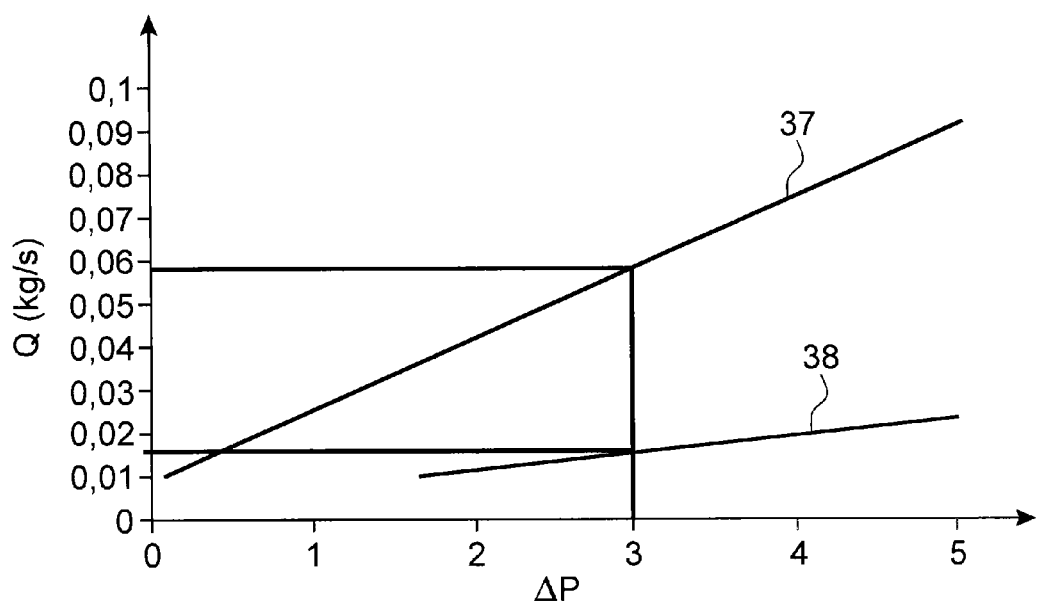

FIG. 3, the operation while hot of the first embodiment;

FIG. 4, a second embodiment;

FIG. 5, a third embodiment;

and FIG. 6 is a diagram illustrating the effect of the invention on the reduction of leaks.

FIG. 1 represents a conventional labyrinth seal 1, arranged between an internal drive shaft 2, and an external drive shaft 3, coaxial and concentric to the preceding shaft. The seal 1 comprises a first component 4, formed of protruding circular sealing lips 5, and which is secured to the internal drive shaft 2, here forming one part therewith. It further comprises a second component 6, in the form of a ring rigidly secured to a support 7, which forms part of the external drive shaft 3, and which comprises a sealing surface belonging to a layer of abradable material 8, which faces the sealing lips 5. The sealing between the drive shafts 2 and 3 is reinforced by a second labyrinth seal 9, adjacent to the preceding seal and of analogous construction to it. A radial clearance of 0.3 mm when cold must remain between the components 4 and 6 of the seals 1 and 9 to enable correct mounting, but this clearance remains in permanent operating conditions and causes air leaks, that it is wished to reduce, between two enclosures 10 and 11 separated by the seals 1 and 9.

A first embodiment of the invention will now be described with the aid of FIG. 2. The seal 1 is replaced by another labyrinth seal 12. The seal 12 comprises a first component 13, similar to the component 4 of the known embodiment, again comprising sealing lips 14, and secured to the internal drive shaft 2 while forming one part therewith. It further comprises a second component 15 secured to the external drive shaft 3, and more precisely to the support 7, in an original manner. This second component 15 consists of a free ring 16 of which the inner face, turned towards the sealing lips 14, is overall cylindrical around the networks of sealing lips 14, also cylindrical, and separated from the sealing lips 5 by a radial clearance, but is hollowed out into a bath 17, and of which the opposite, outer, face comprises a conical portion 18. The conical portion 18 is resting on a face of same conicity of a collar 19 fixed to the support 7 while forming a conical interface. The contact at the conical interface is maintained by a spring 20, compressed between a lip 21 of the external drive shaft 3 and one end of the free ring 16 so as to exert an axial thrust towards the top of the conical interface.

The device further comprises an oil circulation device, adapted to devices assuring the continuous lubrication of a bearing 22 adjacent to the seal 12: the oil flowing from the bearing 22 slides towards the seal 12 on a lip 21, and flows into the bath 17 via the distributor formed by the free end 23 in extending the lip 21 that overhangs the bath 17. The oil fills the bath 17 and overflows therefrom to flow onto the surface of the support 7 while passing around the free ring 16 along a recovery surface of the support 7. Channels are hollowed out through the collar 19 so that it can pass through it, these channels being immersed by a sufficient flow of the oil, so as to prevent air leaks. The oil is then recovered and sent into the enclosure containing the bearing 22. Its movements are assured essentially by the combination of centrifugal forces and a suitable slope of the surfaces on which it flows. The oil is centrifuged against the walls of the enclosure towards the exterior of the turbomachine. In a known manner, the oil from the different components of the enclosure is recovered by a pump, not shown, or through gravity, filtered then re-injected. At high speed, the oil can flow from the bearing with a significant flow rate of several hundreds of liters per hour. A portion of the lubrication flow may however take a diversion, which makes it avoid the free ring 16, flowing directly from the bearing 22 to the oil recovery surface belonging to the support 7, through holes 35 passing through the end of the lip 23. The number and the diameter of these holes 35 make it possible to correctly dimension the flow of oil to supply to the labyrinth seal.

Alternatively, it is possible to arrange a spray nozzle on the part 2 radially facing the bath 17. This spray nozzle may be supplied by a channel passing through the part 2. The oil arrives colder in the bath because it has not passed through the bearing, which favours the low expansion of the free ring 16. With a dedicated spray nozzle or by passing through the bearing, the oil participates in the cooling of the system.

The operation of this embodiment is as follows. The parts are subjected to thermal expansions, in so far as the rotating machine heats up during its operation. Yet it has been provided to construct the free ring 16 using a material such as ceramic, the thermal expansion coefficient of which is lower than that of the other parts, typically metal, made of steel, aluminium or titanium. The free ring 16 is made of a material with a thermal expansion coefficient less than $8 \cdot 10^{-6}$/K, preferentially $5 \cdot 10^{-6}$/K in the temperature range 0° C.-400° C. It is for example chosen from technical ceramics such as silicon carbides or boron nitrides. The metals steel, aluminium and titanium have thermal expansion coefficients close to $14 \cdot 10^{-6}$/K in the considered temperature range. That is why the free ring 16 expands less than the other parts and why the clearance that it makes with the sealing lips 14 of the other component 13 of the seal 12 is reduced, down to a value which can reach 0.1 mm at steady state. Since the expansion of the free ring 16 is less than that of the support 7 and of the collar 19, the spring 20 pushes the free ring 16 towards the left of the figure and towards the collar 19 to maintain the sliding contact at the conical interface and maintain the free ring 16 centred. The oil flush with the edge of the bath 17 forms a free cylindrical sealing surface 25 produced by centrifugal forces, which replaces that of the abradable material and limits air leaks, in cooperation with the sealing lips 14. Since the sealing surface is liquid, no deterioration of the seal 12 occurs if the sealing lips 14 are immersed in the sealing surface at certain rates of the machine. The oil may fulfil the additional role of limiting the heating of the free ring 16, and thus further reduce its thermal expansions. The holes 35, contributing to limiting the flow of oil passing through the free ring 16, nevertheless make it possible, if necessary, to limit the cooling that they provide.

The preceding seal 9 remains and makes it possible to assure a suitable sealing, if the seal 12 of the invention has insufficient performance at certain moments of the operation of the machine. Since the components of the seal 9 are secured to the drive shafts 2 and 3, their thermal expansions are more or less identical, and the clearance passing through this seal 9 is more or less constant during operation.

The operation of the seal 12 is shown schematically in FIG. 3, which also represents its final state: the arrow 26 illustrates the radial expansion of the support 7; the arrow 27, the axial displacement of the free ring 16 under the effect of the relative expansion of its housing 7; also represented is the spring 20 in a relaxed state. The cone angle will be as big as possible in order to limit the amplitude of axial displacement and jamming during the contraction of its support. The cone half-angle is for example at least 3° and may be greater than 10° or even 15° if the size of the system allows it. A small axial displacement advantageously makes it possible to simplify the design of the spring 20.

The embodiment of FIG. 4 differs from the preceding embodiment in that the component 13, bearing the sealing lips 14 of the seal 12, is here a part separated from the internal drive shaft 2. The component 13 is then in the form of a ring retained on the internal drive shaft 2, between a circular tongue 28, on one side and a stop seal 29 on the opposite side. The securement of the component 13 on the internal drive shaft 2 is in principle fixed since the tongue 28 penetrates into the internal drive shaft 2, but the arrangement of the invention all the same makes it possible to dissociate the thermal expansions of the component 13 and the internal drive shaft 2, either by enabling quicker temperature variations of the component 13, when it is exposed to leaks of hot gas, but that the internal drive shaft 2, more massive, is thus more inert and still cold, or by choosing the material of the component 13 different from that of the internal drive shaft 2, and having a greater expansion coefficient.

In both cases, the thermal expansions of the component 13 are greater than those of neighbouring portions of the internal drive shaft 2 and thus contribute to further reducing the clearance through the seal 12, rather in transient state in the first case and at steady state in the second case.

And the embodiment of FIG. 5 shows that the free ring 16 of the preceding embodiments may be replaced by a free ring 30 of analogous shape, but the inner face of which is provided with an abradable layer 31, as in the prior embodiments. The flow of oil into the bath 17 is then eliminated, and the circuit for lubricating the bearing 22 is designed as in known designs; it avoids the component 30 and the free end 23 is eliminated. This embodiment again functions by exploiting a differential thermal expansion of the free ring 30, with respect to the support 7, on a conical interface 32. Here again, a spring, now referenced 33, is used to push back the free ring 30 axially and to maintain contact on the conical interface 32. The spring 33 may consist of a conical washer or of a stack of conical washers. The compression takes place between the free ring 30 and a seal 34 established at the surface of the support 7.

As has been mentioned above, a nominal radial clearance of 0.3 mm when cold has to be accepted in the designs between the components of conventional labyrinth seals 1 and 9. The air flow Q then escaping through the seals is given by curve 37 of FIG. 6 as a function of the pressure difference $\Delta P$ between the two sides of the seal (for a labyrinth with five sealing lips of 113 mm diameter, a temperature of 150° C. and a downstream pressure of 0.9 bar): it is 0.059 kg/s for a difference of 3 bars.

The application of the invention makes it possible to reduce the nominal radial clearance when cold to 0.1 mm between the components of the labyrinth seals, and in the same conditions, the leakage air flow is given by curve 38: it may be seen that it is 0.016 kg/s for the same pressure difference of 3 bars, i.e. 3.8 times less, which illustrates the interest of the invention.

The invention claimed is:

1. A labyrinth seal between two parts in relative rotation about an axis of rotation, the labyrinth seal comprising:
    a first component and a second component facing the first component, the components being concentric, separated by a clearance and each secured to a respective one of the two parts, and
    a sealing surface that is formed of a liquid,
    wherein one of the components is a mobile component, which is secured to the respective one of the two parts by a conical interface having a conicity directed along the axis of rotation, formed of a conical face of a collar fixed to said one of the two parts and of a conical face, opposite the clearance, of said mobile component, the conical faces being in sliding contact on each other and having a same conicity, and by a spring maintaining said mobile component against the conical face of the collar by a thrust along the axis of rotation, and the mobile component and the collar have different thermal expansion coefficients to adjust the clearance during use, and
    wherein the mobile component surrounds the other component that is not the mobile component, and the mobile component forms a bath facing the other component that is not the mobile component and receiving the liquid.

2. The labyrinth seal according to claim 1, wherein the first component comprises protruding circular sealing lips, and the sealing surface is of the second component and faces the sealing lips.

3. The labyrinth seal according to claim 1, wherein the mobile component and the other component that is not the mobile component also have different thermal expansion coefficients.

4. The labyrinth seal according to claim 1, wherein the mobile component has a thermal expansion coefficient less than that of at least one of the collar and the other component that is not the mobile component.

5. The labyrinth seal according to claim 1, wherein the mobile component is made of ceramic, and the other component that is not the mobile component and the two parts in relative rotation are made of steel, aluminium or titanium.

6. A rotating machine, comprising:
two parts in relative rotation, and
the labyrinth seal according to claim 1.

7. The rotating machine according to claim 6, further comprising a device to supply the liquid including a distributor situated in front of the bath, and said distributor is a free end.

8. The rotating machine according to claim 7, further comprising a bearing adjacent to the labyrinth seal, the liquid is a lubrication oil of the bearing, and the device to supply the liquid belongs to an oil circuit further including a recovery surface to recover the oil surrounding the second component.

9. The rotating machine according to claim 8, wherein the oil circuit comprises a partial diversion of the oil which circumvents the free end and a bowl and leads directly to the recovery surface.

10. The rotating machine according to claim 7, further comprising a second labyrinth seal including a first component provided with protruding circular sealing lips and a second component provided with another sealing surface facing said sealing lips, and the components of the second labyrinth seal are fixedly secured to the two parts in relative rotation.

11. The rotating machine according to claim 7, wherein the two parts are two rotors belonging to drive shafts driven at different rotational speeds, and the labyrinth seal establishes a sealing between two of the drive shafts.

12. The rotating machine according to claim 6, wherein the spring includes a conical washer or a stack of conical washers.

* * * * *